United States Patent
Nakagawa

(10) Patent No.: US 6,812,414 B2
(45) Date of Patent: Nov. 2, 2004

(54) WEIGHING SCALE

(75) Inventor: Yoshiyuki Nakagawa, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 63 days.

(21) Appl. No.: 10/110,468

(22) PCT Filed: Aug. 13, 2001

(86) PCT No.: PCT/JP01/06971
§ 371 (c)(1),
(2), (4) Date: Apr. 12, 2002

(87) PCT Pub. No.: WO02/14807
PCT Pub. Date: Feb. 21, 2002

(65) Prior Publication Data
US 2002/0148653 A1 Oct. 17, 2002

(30) Foreign Application Priority Data
Aug. 15, 2000 (JP) ........................................ 2000-246179

(51) Int. Cl.⁷ .......................... G01G 3/14; G01G 19/44; G01G 21/23; G01G 21/24; G01G 23/06
(52) U.S. Cl. ........................ 177/211; 177/238; 177/255; 177/DIG. 9
(58) Field of Search ................................ 177/211, 229, 177/238, 239, 255, DIG. 9

(56) References Cited
U.S. PATENT DOCUMENTS 4,411,327 A * 10/1983 Lockery et al. ............. 177/211
4,483,404 A * 11/1984 Weihs ......................... 177/255
4,554,987 A * 11/1985 Dillon ........................ 177/134
4,611,678 A    9/1986 Andriewsky ................ 177/211
4,899,840 A *  2/1990 Boubille ..................... 177/139
5,425,278 A    6/1995 Perkins ....................... 177/211

FOREIGN PATENT DOCUMENTS

| | | |
|---|---|---|
| FR | 2 608 759 | 6/1988 |
| JP | 61-116621 | 6/1986 |
| JP | 64-43729 | 2/1989 |
| JP | 3-48501 | 10/1991 |

* cited by examiner

Primary Examiner—Randy W. Gibson
(74) Attorney, Agent, or Firm—Smith, Gambrell & Russell, LLP

(57) ABSTRACT

A strain plate (4) is placed on a base plate member (3) without using any fixing means. The strain plate (4) is formed with a straight groove (7) for restricting its strain direction to one direction. The base plate member (3) is fitted with position regulating members (14) opposite the four corner portions of the strain plate (4), individually. Each position regulating member (14) is formed with a slit such that a part of it can be elastically deformed with ease. The position regulating blocks can absorb the displacement of the sides of the strain plate that is caused when the strain plate (4) is deformed as a weighing machine (1) is loaded.

24 Claims, 12 Drawing Sheets

FIG. 4A
FIG. 4B
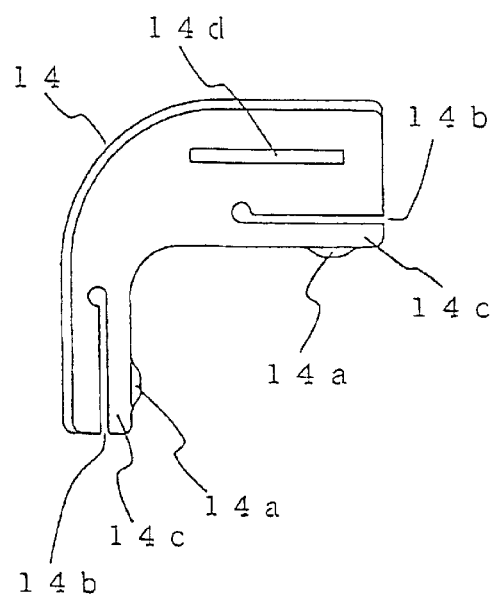
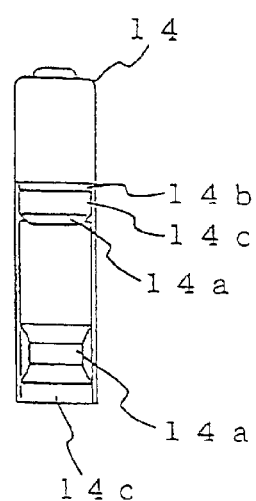

WEIGHING SCALE

TECHNICAL FIELD

The present invention relates to a weighing machine for weighing human bodies and the like.

BACKGROUND ART

In a conventional weighing machine, a strain plate is strained in a manner such that a load from a scale plate on which an object to be weighed, such as a human body, is placed is transmitted to and concentrated on one point by means of a load transmission mechanism (beam balance) that is formed of a plurality of metal plates combined with one another. The change of a resistance value of a strain gauge that is pasted on the strain plate is detected, or the change of capacitance is detected by varying the distance between two electrode plates as the strain plate is displaced, and the change is converted into load.

In the beam balance described above, metal plates are used in combination with one another in a manner such that they are set upright to stand load from the scale plate, and load transmitting metal plates for transmitting the load from the scale plate to a beam metal plate must be constructed as knife edge fittings, so that the balance normally inevitably has a great thickness of 35 mm or more. Further, knife edge portions are subjected to a very high pressure, so that they are forced to deform and wear away after repeated use, thus failing to ensure long-term reliability.

To cope with this, a technique of a thin weighing machine with simple construction and high long-term reliability is described in Publication No. WO00/06977, for example. An outline of this weighing machine will now be described with reference to FIGS. 13 and 14.

As shown in FIG. 13, a weighing machine 50 is formed in a manner such that a scale plate 51, one strain plate 52, and a base plate 53 are combined in layers. The strain plate 52 and the scale plate 51 are fixed in layers with scale plate spacers 54 between them by means of bolts and screws, and the strain plate 52 and the base plate 53 are fixed in layers with base plate spacers 55 between them by means of bolts and screws. The base plate 53 is provided with a circuit portion 56, which includes control and arithmetic circuits such as a microcomputer, a display portion 57 for displaying the result of computation, and a power source retaining portion 58, and its plane shape is optional.

Further, the scale plate 51 in the form of a plate is connected to load receiving portions 59 of the strain plate 52 by means of the scale plate spacers 54. The weighing machine 50 is configured to be a weighing machine that is formed of three flat plates and can be made very thin.

In the case where the weighing machine 50 is placed on a floor surface, leg portions 60 can be provided on a part of the strain plate 52. For example, one or more leg portions 60 provided on the strain plate 52 can be arranged in any other region(s) of outer frames 61 than regions right under fixing portions 62 to which the base plate 53 is fixed. To attain this, hollow portions 63 are formed in the base plate 53.

The strain plate 52 is formed integrally of a sensitive portion 66 including a strain gauge 65 for use as sensing means, load transmitting beams 64 connecting with the sensitive portion 66, and load receiving portions 59. An upper surface 67 of the one strain plate 52 is provided with a center groove portion 68, which includes the sensitive portion 66 and is formed extending parallel to a straight line L—L that connects the respective center points C of the load receiving portions 59. A weight applied to the scale plate 51 is received dispersedly by means of the load receiving portions 59, the load is caused to act concentratedly on the sensitive portion 66 by means of the load transmitting beams 64, and strain or deformation of the sensitive portion 66 is picked up as a change of the quantity of electricity by means of the strain gauge 65.

The load applied to the weighing machine 50 of FIG. 13 acts on the strain plate 52. In a weighing machine such as a scale that measures a heavy weight, in particular, screw portions for fixing the strain plate 52 and the base plate 53 are liable to loosened by repeated loading. If the screw portions loosen, the position of the strain plate 52 relative to the base plate member is shifted, so that the way the strain plate 52 is strained changes with every measurement. In consequence, measurements of the same weight involve different ways of transmission to the strain gauge 65, inevitably causing measurement errors. Further, a shock of a fall or the like also creates gaps between the strain plate 52 and screws, so that the measurement accuracy lacks in reliability.

Another prior art is also described in Publication No. WO00/06977. In this case, a strain plate and a base plate are fixed by means of the following arrangement instead of screwing. As shown in FIG. 14, a base plate 53 is in the form of an open-topped box, a strain plate 52 is arranged in the box, and fixing members 70 for preventing vibration and displacement of the strain plate 52 are arranged between the corner portions of the strain plate 52 and a peripheral wall 69 of the base plate 53.

If sides 70a of the fixing members 70 and sides 52a of the strain plate 52 are brought intimately into contact with one another, in a weighing machine of the alternative prior art described above, however, the central portion of the strain plate 52 sinks during measurement, and the sides 52a of the strain plate 52 warp, thereby pressing the inner sides 70a of the fixing members 70. After repeated use, therefore, gaps are formed between the fixing members 70 and the strain plate 52, so that the strain plate 52 is dislocated, and the measurement may possibly be subject to dispersion, as in the case of the aforesaid screwing method. If gaps are previously provided between the fixing members 70 and the strain plate 52 to prevent this, however, the position of the strain plate 52 is finely shifted with every measurement, so that measurement errors may possibly occur. A shock of a fall or the like also creates gaps between the fixing members 70 and the strain plate 52, resulting in the same problem.

DISCLOSURE OF THE INVENTION

The object of the present invention is to provide a thin weighing machine of high-reliability, which stands repeated use and whose measurement accuracy is influenced little by a shock of a fall or the like.

In order to achieve the above object, a weighing machine according to an aspect of the present invention comprises a substantially flat strain plate adapted to be deformed when loaded, a sensor for detecting deformation of the strain plate, a base plate member carrying the strain plate thereon, and a scale plate member located on the upper surface of the strain plate and capable of transmitting load to the strain plate, the sides of the strain plate being held by means of elastic position regulating members, individually.

The weighing machine according to this aspect can adopt the following forms.

The strain plate has a strain-direction regulating portion for regulating the direction of a strain produced in the strain plate as the strain plate is deformed. The sensor is a strain gauge attached to the strain plate corresponding to the strain direction of the strain plate. The position regulating members hold at least the sides of the strain plate which extend at right angles to the strain direction.

The strain plate is formed with at least two sides extending at right angles to the strain direction and opposed to each other across the strain-direction regulating portion, the two sides being held by means of the position regulating members, individually. Further, the position regulating members hold a plurality of portions of the sides of the strain plate perpendicular to the strain direction. Furthermore, the position regulating members hold two portions near the opposite end portions of the sides of the strain plate perpendicular to the strain direction.

The position regulating members hold those sides of the strain plate which extend parallel to the strain direction as well as the sides of the strain plate perpendicular to the strain direction. The strain plate is formed with a plurality of sides parallel to the strain direction, the sides being held by means of the position regulating members. The position regulating members for holding the sides parallel to the strain direction hold portions near the end portions of the sides of the strain plate parallel to the strain direction.

The strain plate is formed with at least two sides extending at right angles to the strain direction and opposed to each other across the strain-direction regulating portion, and the position regulating members for holding the sides perpendicular to the strain direction hold one portion near the center of each side perpendicular to the strain direction.

Each of the position regulating members includes a fixed portion fixed to the base plate member and a contact portion formed integrally with the fixed portion and in contact with the side of the strain plate, the contact portion being made elastic by means of a slit formed between the contact portion and the fixed portion.

Each of the position regulating members is composed of a fixed portion fixed to the base plate member and an elastic portion in contact with the side of the strain plate and attached to the fixed portion.

The strain plate has two openings in symmetrical positions on the opposite sides of the strain gauge, the position regulating members holding inner walls formed in the openings.

Each of the position regulating members has a protuberance, the protuberance being in contact with the side of the strain plate.

The individual sides of the strain plate are arranged so as to be in contact with the position regulating members only.

The plane shape of the strain plate is substantially rectangular, and the position regulating members are substantially L-shaped members arranged individually near the four corners of the rectangular shape. The substantially L-shaped member is formed with a hole portion such that the L-shaped member can be fixed to the scale plate member with the hole portion fitted on a fitting member protruding substantially perpendicularly from the scale plate member.

The position regulating members for holding the sides of the strain plate perpendicular to the strain direction and the position regulating members for holding the sides of the strain plate parallel to the strain direction are formed separately from one another.

Further, a weighing machine according to another aspect of the present invention comprises a substantially flat strain plate adapted to be deformed when loaded, a sensor for detecting deformation of the strain plate, a base plate member carrying the strain plate thereon, and a scale plate member located on the upper surface of the strain plate and capable of transmitting load to the strain plate, the position of the strain plate in the planar direction being settled by means of elastic position regulating members.

BRIEF DESCRIPTION OF THE DRAWINGS

FIG. 4A is a plan view of a position regulating member of FIG. 1;

FIG. 4B is a right-hand side view of the position regulating member of FIG. 4A;

BEST MODE FOR CARRYING OUT THE INVENTION

A first embodiment of the present invention will be described with reference to FIGS. 1 to 8.

Figure 1:
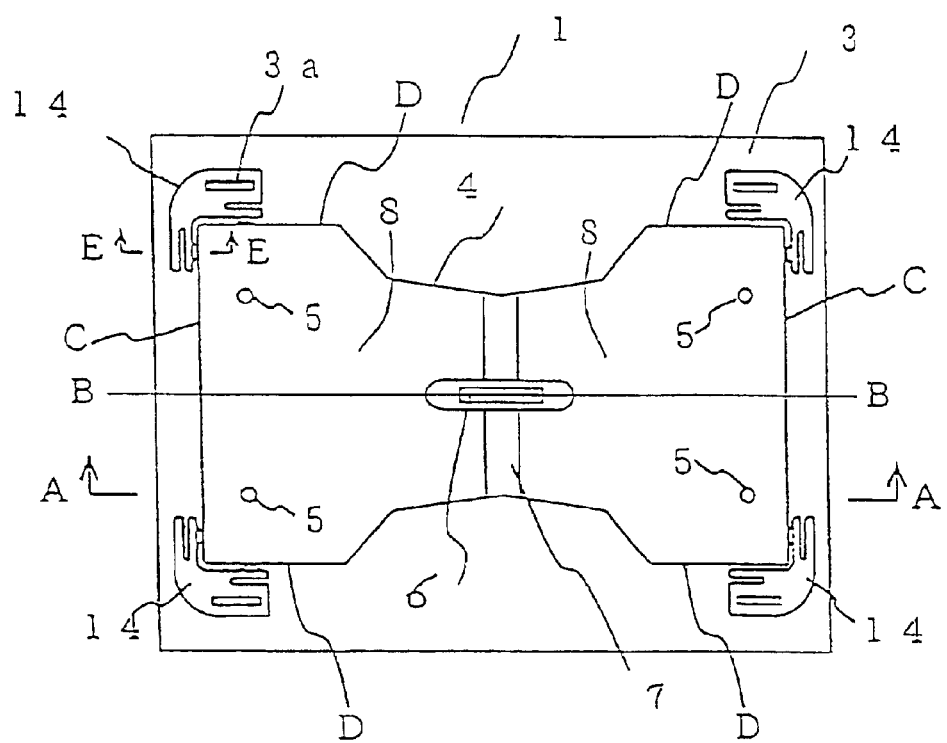
FIG. 1 is a plan view of a weighing machine according to a first embodiment of the present invention, the weighing machine being cleared of its scale plate.
Figure 2:
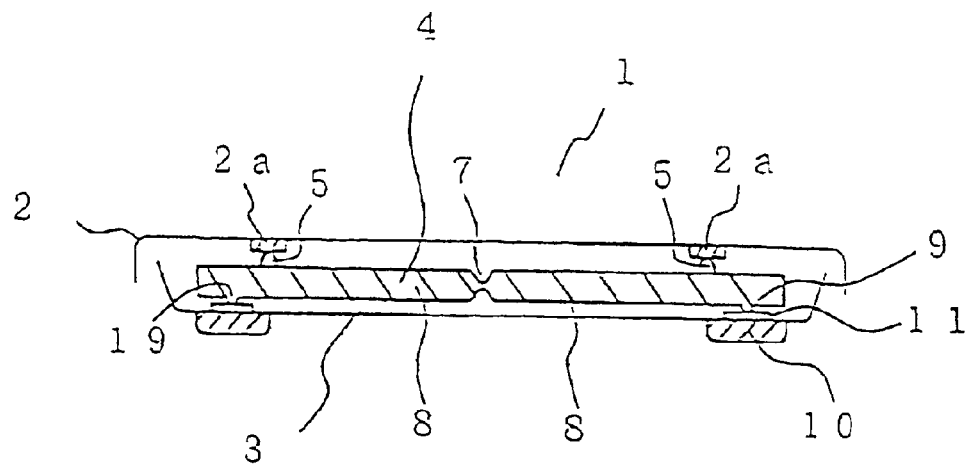
FIG. 2 is a sectional view taken along line A—A of FIG. 1.
Figure 3:
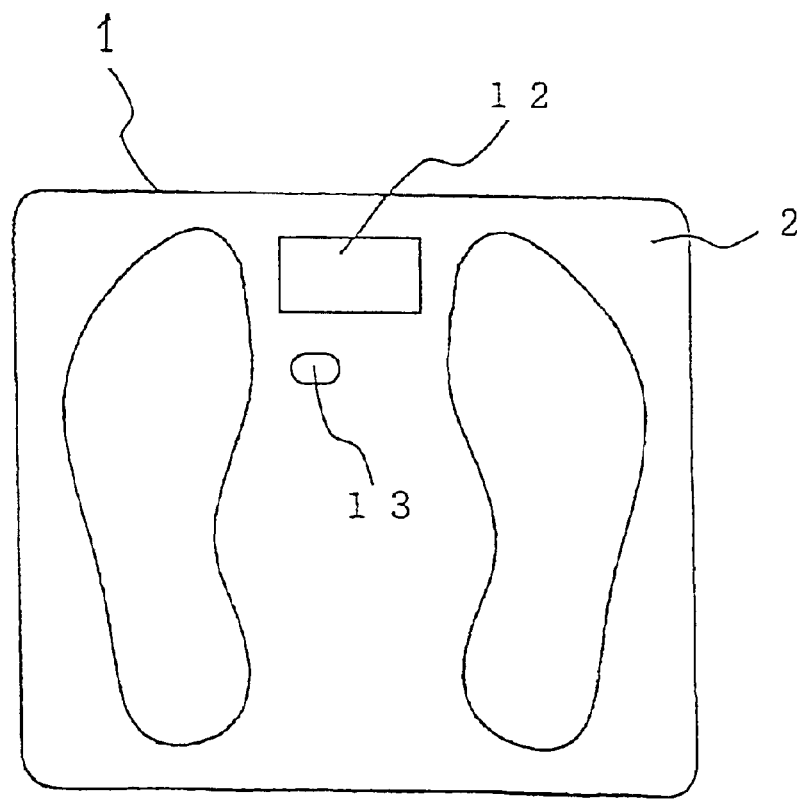
FIG. 3 is a plan view of the weighing machine (fitted with the scale plate) of FIG. 1.

As shown in FIGS. 1 to 3, a weighing machine 1 comprises a strain plate 4, a base plate member 3 on which the strain plate 4 is placed without using fixing means such as screws or bolts, and a scale plate member 2 that is located on the upper surface of the strain plate 4 and serves to transmit load to the strain plate 4.

The strain plate 4 is formed of one plate member having a substantially rectangular flat surface. Load receiving portions 5, which are in the shape of a hemisphere each, are fixed individually to regions near the four corners of the upper surface of the strain plate 4. On the other hand, receiving members 2a in the form of a plate are fixed individually to the portions of the lower surface of the scale plate member 2 at the portion facing the load receiving portions 5. Load that is applied to the scale plate member 2 is transmitted to the four load receiving portions 5 of the strain plate 4 through the receiving members 2a.

Further, the strain plate 4 is formed with grooves that extend straight in its transverse direction (direction perpendicular to line B—B of FIG. 1) in its central portion and form a strain-direction regulating portion 7. Although the grooves of the strain-direction regulating portion 7 are formed individually on the upper and lower surfaces of the strain plate 4, as shown in FIG. 2, one of them may alternatively be formed only on the upper surface of the strain plate 4. The grooves (strain-direction regulating portion 7) formed on the strain plate 4 serve to regulate the strain direction of the strain plate 4 to its longitudinal direction (direction B—B of FIG. 1).

A strain gauge 6 is mounted on the strain plate 4 so as to extend along line B—B of FIG. 1 astride the grooves of the strain-direction regulating portion 7. The strain gauge 6 is attached to only the upper surface of the strain plate 4 or each of the upper and lower surfaces. The strain gauge 6 senses strain of the strain plate 4 whose strain direction is regulated. The central portion of the strain plate 4 where the strain-direction regulating portion 7 is excluded constitute load transmission beams 8 that transmit load on the load receiving portions 5 to the strain gauge 6.

The four load receiving portions 5 on the strain plate are arranged so as to be symmetrical with respect to the centerline of each groove of the strain-direction regulating portion 7 and also line B—B of FIG. 1.

Base plate balls 19, which are in the shape of a hemisphere each, are fixed to the lower surface of the strain plate 4 at regions near the four corners thereof, respectively. As shown in FIG. 2, the base plate balls 19 are arranged remoter from the strain-direction regulating portion 7 than the load receiving portions 5 are. In other words, the distance between the base plate balls 19 in the longitudinal direction is greater than the distance between the load receiving portions 5 in the longitudinal direction. However, the distance between the base plate balls 19 in the transverse direction is equal to the distance between the load receiving portions 5 in the transverse direction.

Receiving members 11 in the shape of a plate are provided on the upper surface of the base plate member 3 at the locations opposite the base plate balls 19 of the strain plate 4. On the other hand, leg portions 10 are provided on the lower surface of the base plate member at the locations opposite the receiving members 11.

As described above, the strain plate 4 is supported on the receiving members 11 of the base plate member 3 by means of the base plate balls 19 that are arranged remoter from the strain-direction regulating portion 7 than the load receiving portions 5. If the scale plate member 2 is loaded with an object (human body or the like) to be weighed, it is deformed only in the direction perpendicular to the grooves of the strain-direction regulating portion 7, that is, in the direction of line B—B of FIG. 1. The strain gauge 6 detects strain that is attributable to deformation in a portion near the center of the strain plate 4.

An output signal from the strain gauge 6 is processed in a signal processing circuit (not shown), and a display portion 12 displays the load of the object to be weighed, as shown in FIG. 3. In FIG. 3, number 13 denotes a power switch of the weighing machine 1.

As shown in FIG. 1, the strain plate 4 that is placed on the base plate member 3 is held so that its sides C perpendicular to the strain direction B—B are positioned with respect to the base plate member 3 by means of a plurality of elastic position regulating members 14. These position regulating members 14 are attached to the base plate member 3.

The position regulating members 14 are substantially L-shaped blocks, which are arranged individually in regions near the four corners of the strain plate 4, whereby regions near the end portions of the sides C of the strain plate 4 in the direction perpendicular to the strain direction B—B and regions near the end portions of sides D of the strain plate 4 in the direction parallel to the strain direction B—B are held in position.

The shape of the position regulating member 14 will now be described with reference to the plan view of FIG. 4A and the side view of FIG. 4B.

The position regulating member 14 is formed of an L-shaped block of an ABS material or the like. Protuberances 14a that abut against side walls of the strain plate 4 are provided individually on two inner sides of the L-shaped position regulating member 14. Further, the position regulating member 14 is formed with slits 14b having a given length that extend individually inward from its opposite ends, whereby elastic portions 14c capable of elastic deformation are formed ranging form the slits 14b to the inner sides.

Furthermore, a mounting hole 14d is formed in a part of the position regulating member 14. The position regulating member 14 is mounted on the base plate member 3 by fitting a bent portion 3a (see FIG. 1), which is formed by slitting the base plate member 3 at a region near each of the four corners thereof and bending the resulting strip upright, into the mounting hole 14d.

Each protuberance 14a on the position regulating member 14 substantially has the shape of a semi-cylinder or hemisphere such that the friction of contact with the strain plate 4 is reduced. In the case where the protuberance is semi-cylindrical, it may be arranged so that the axial direction of the cylinder is in line with the thickness direction of the strain plate, as shown in FIGS. 4A and 4B, or that the axial direction of the cylinder is perpendicular to the thickness direction of the strain plate (not shown).

The material that constitutes the position regulating member 14 is not limited to the ABS material, and may be any material as far as the elastic portions 14c can resist repeated use.

Figure 5A:
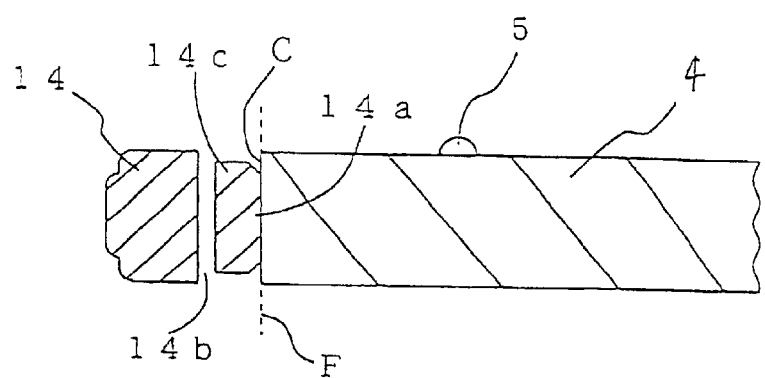
FIG. 5A is a sectional view taken along line E—E of FIG. 1, showing a state of contact between the position regulating member and a strain plate, where the strain plate is not in deformed (or is no-load) state.
Figure 5B:
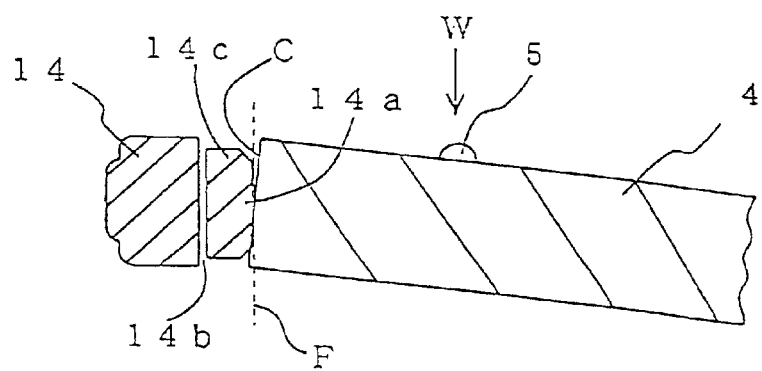
FIG. 5B shows a state (loaded) in which the strain plate of FIG. 5A is loaded and deformed.

The state of contact between the position regulating member 14 and the strain plate 4 will now be described with reference to FIGS. 5A and 5B. FIG. 5A shows a state in which the strain plate 4 is not deformed with no load on the scale plate member 2. FIG. 5B shows a state in which the strain plate 4 is deformed with load on the scale plate member 2.

When the strain plate 4 is not deformed, as shown in FIG. 5A, the side wall on the side C of the strain plate 4 that extends at right angles to the strain direction B—B is in contact with the protuberance 14a of the position regulating member 14 on a vertical line indicated by dotted line F.

When the strain plate 4 is deformed with a load W on the load receiving portion 5, as shown in FIG. 5B, however, the strain plate 4 is deformed and inclined, so that the side wall on the side C of the strain plate 4 ceases to be in line with the vertical line F, and a part of the strain plate 4 presses the protuberance 14a of the position regulating member 14. If the protuberance 14a of the position regulating member is thus pressed by the strain plate 4, a portion of the strain plate 4 that adjoins the slit is elastically deformed and narrows the slit width of the slit 14b, thereby absorbing the deformation of the strain plate 4.

If the load is removed from the state shown in FIG. 5B, the strain plate 4 is restored to its original flat state by its elasticity, and the side face C of the strain plate 4 is pressed by the protuberance 14a of the position regulating member 14 by the elastic force of the elastic portion 14c of the position regulating member 14, whereupon the strain plate 4 is restored to its original position shown in FIG. 5A. Thus, the displacement of the strain plate 4 is absorbed by the elastic force of the position regulating member 14, so that no gap is formed between the strain plate 4 and the position regulating member 14 even after repeated use of the weighing machine 1.

Further, the position regulating member 14 also positions and holds the side D of the strain plate 4 that is parallel to the strain direction B—B as well as the side C of the strain plate 4 that extends at right angles to the strain direction B—B. If any shock attributable to a fall or the like is applied in the direction B—B or the direction perpendicular to B—B, therefore, the position regulating member 14 absorbs the displacement of the strain plate 4, so that the strain plate 4 is restored to its original position. Thus, initial accuracy can be maintained for any length of time.

Further, the strain plate 4 can be held more steadily by locating the position regulating members 14 in regions near the four corners of the strain plate 4. Since the friction of contact between the strain plate 4 and the position regulating members 14 is minimized by means of the abutting protuberances 14a, furthermore, the accuracy can be maintained for a long period of time without being substantially influenced by repeated use, fall, etc.

The base plate member 3 is a box-shaped structure that is formed of a rectangular base and side walls set up individually on the four circumferential sides of the base. If there are gaps between the base plate member 3 and the position regulating members 14, as shown in FIG. 1, the peripheral wall of the base plate member 3 may possibly be deformed if the weighing machine 1 is dropped.

Figure 6A:
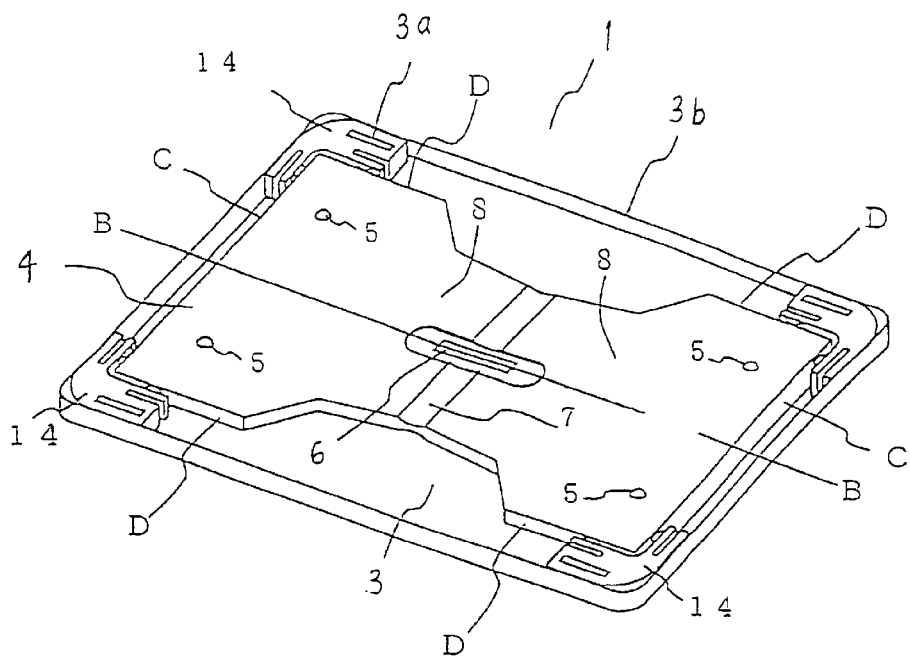
FIG. 6A is a perspective view showing a modification of the weighing machine according to the first embodiment.
Figure 6B:
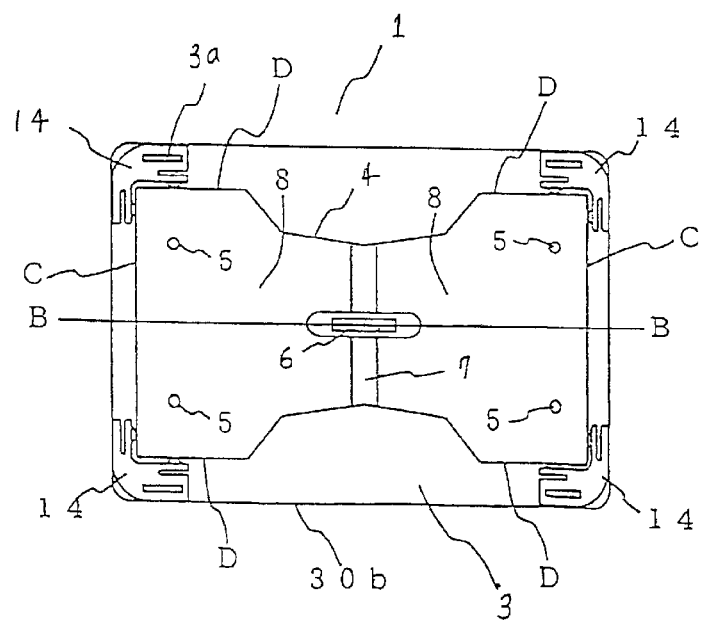
FIG. 6B is a plan view of the weighing machine of FIG. 6A.

As shown in FIG. 6A (perspective view) and FIG. 6B (plan view), therefore, the transverse and longitudinal dimensions of the strain plate 4 with respect to the base plate member 3 are made greater than in the case of FIG. 1 so that no gaps can be created between a peripheral wall 3b of the base plate member 3 and the position regulating members 14 shown in FIG. 4A when the position regulating members 14 are arranged near the four corners of the strain plate 4. With this arrangement, the position regulating members 14 can restrain the peripheral wall 3b from sinking inward if any external force acts on the peripheral wall 3b of the base plate member 3 when the weighing machine 1 is dropped accidentally. Alternatively, creation of the gaps between the peripheral wall 3b of the base plate member 3 and the position regulating members 14 may be prevented by making the width of each position regulating member 14 to be attached to the base plate member 3 greater than in the case of FIG. 1 without changing the size of the strain plate 4 shown in FIG. 1.

By increasing the transverse and longitudinal dimensions of the strain plate 4, creation of the gaps between the peripheral wall 3b of the base plate member 3 and the position regulating members 14 may be prevented when the position regulating members 14 are arranged in the regions near the four corners of the strain plate 4. Alternatively, the position regulating members 14 themselves may be sized so that no gaps can be created between the position regulating member 14 and the peripheral wall 3b of the base plate member 3.

Figure 7:
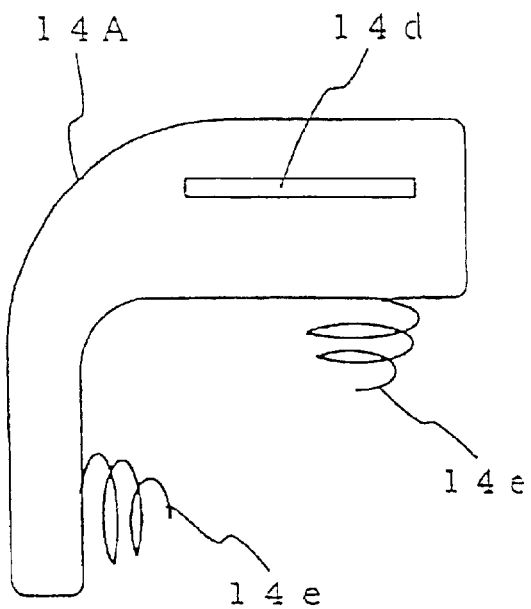
FIG. 7 is a plan view of another position regulating member separate from the position regulating member shown in FIG. 4A.
Figure 8:
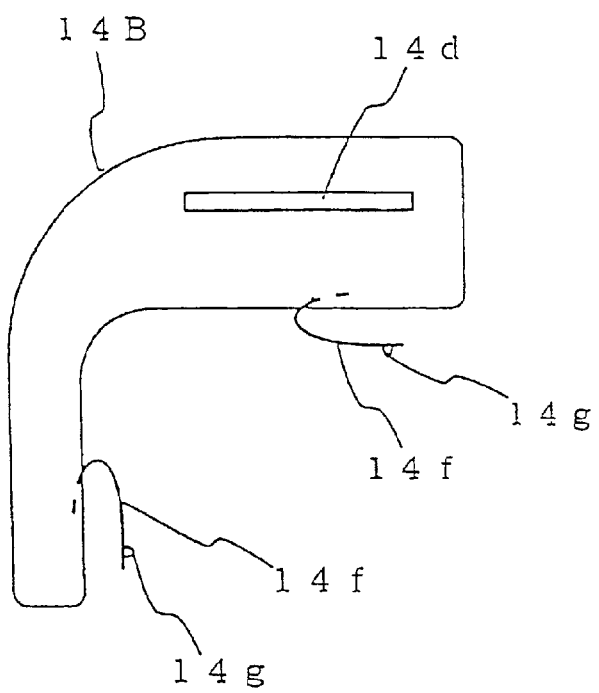
FIG. 8 is a plan view of still another position regulating member separate from the position regulating member shown in FIG. 4A.

FIGS. 7 and 8 show position regulating members having constructions different from that of the position regulating member 14 shown in FIGS. 4A and 4B.

A position regulating member 14A shown in FIG. 7 is an L-shaped block that is formed of an ABS material or the like. Coil springs 14e are fixed individually to two inner sides of the L-shaped position regulating member 14A. One end of each coil spring 14e is fixed to the side face of the position regulating member 14A, while the other end is elastically in contact with the wall surface of the strain plate 4. Thus, the coil spring 14e combines the respective functions of the protuberance 14a and the elastic portion 14c of the position regulating member 14 shown in FIG. 4A (and therefore, the position regulating member 14A need not be provided with any slit for the formation of the elastic portion).

Further, the position regulating member 14A is formed with a mounting hole 14d such that the position regulating member 14A can be fixed to the base plate member 3 by fitting the mounting hole 14d on the bent portion 3a (see FIG. 1) of the base plate member 3.

These coil springs 14e are configured to hold the side D of the strain plate 4 that is parallel to the strain direction B—B as well as the side C of the strain plate 4 that extends at right angles to the strain direction B—B. Accordingly, the same functions as aforesaid can be fulfilled, that is, the position regulating members 14 can absorb the displacement of the strain plate 4 if the weighing machine 1 is used repeatedly or any shock of a fall or the like acts on the strain plate 4. After the load is removed, therefore, the strain plate 4 is restored to its original position, so that the initial accuracy can be maintained for any length of time.

In a position regulating member 14B shown in FIG. 8, leaf springs 14f are used in place of the coil springs 14e of the position regulating member 14A described above. One end portion of each leaf spring 14f is molded in an L-shaped wall, while the other end portion is formed with a protuberance 14g that abuts against the side C or the side D of the strain plate 4 extending at right angles or parallel to the strain direction B—B. Further, the position regulating member 14B is provided with a mounting hole 14d. Constructed in this manner, it has the same functions as that of the position regulating member 14A described above.

A second embodiment of the present invention will now be described with reference to FIG. 9.

In this embodiment, elastic position regulating members 15 are arranged on sides C of a strain plate 4 that extend at right angles to its strain direction B—B, while fixing members 16 are arranged on sides D of the strain plate 4 that are parallel to the strain direction B—B.

Each position regulating member 15 is a rectangular block that is formed of an ABS material or the like. A protuberance 15a is provided on the side face of the position regulating member 15 which faces a side wall of the strain plate 4. Thus, the position regulating member 15 comes into contact with a side wall C of the strain plate 4 through its protuberance 15a. The position regulating member 15 is formed with a slit 15b with a given length that extends parallel to its side face on which the protuberance 15a is provided, whereby an elastic portion 15c capable of elastic deformation is formed adjacent to the slit 15b.

Further, a mounting hole 15d is formed in the position regulating member 15, and the position regulating member 15 can be fixed to a base plate member 3 by fitting the mounting hole 15d on a bent portion 3a of the base plate member 3.

Each fixing member 16 is a rectangular block that is formed of an ABS material or the like. A protuberance 16a is provided on the side face of the fixing member 16 which engages a side wall D of the strain plate 4. Thus, the fixing member 16 comes into contact with the side D of the strain plate 4 through its protuberance 16a. Further, the fixing member 16 is provided with a mounting hole 16b such that the fixing member 16 can be fixed to the base plate member 3 with the mounting hole 16b fitted on the bent portion 3a of the base plate member 3.

Preferably, four position regulating members 15 in total should be arranged opposite the sides C of the strain plate 4 perpendicular to the strain direction B—B and in positions at equal distances from line B—B. The position of the strain plate 4 can be kept particularly stable if the position regulating members 15 are arranged near the opposite end portions of the sides C of the strain plate 4. Further, four fixing members 16 in total should be arranged near the four end portions of the sides D of the strain plate 4 parallel to the strain direction B—B such that they oppose the sides D.

Figure 9:
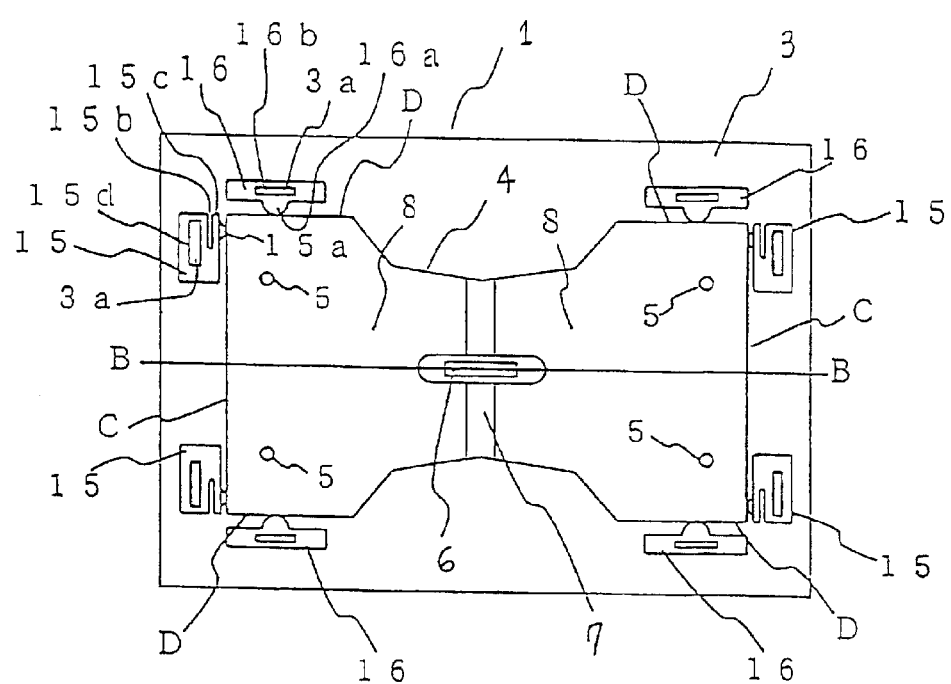
FIG. 9 is a plan view of a weighing machine according to a second embodiment of the present invention, the weighing machine being cleared of its scale plate.

If a load is applied to a weighing machine 1 shown in FIG. 9, the strain plate 4 is deformed to press the protuberances 15a of the position regulating members 15. Thereupon, the portions adjacent to the slits 15b of the position regulating members 15 are elastically deformed to narrow the slit width, thereby absorbing the deformation of the strain plate 4. As this is done, the protuberances 16a of the fixing members 16 are in contact with the side faces D of the strain plate 4 and prevent the strain plate 4 from being dislocated. When the load is removed from the weighing machine 1, the strain plate 4 is restored to its original position by the elastic force of the elastic portions 15d of the position regulating members 15.

In the weighing machine 1 shown in FIG. 9, the displacement of the sides C of the strain plate 4 perpendicular to the strain direction B—B, which is attributable to the deformation of the strain plate 4, is absorbed by the elastic position regulating members 15, and the fixing members 16 engage and hold the sides D of the strain plate 4 parallel to the strain direction B—B. Accordingly, dislocation of the strain plate 4 can be prevented and the position of the strain plate 4 never changes if the frequency of use increases, so that the measurement accuracy can be maintained for a long period of time. If the weighing machine 1 is dropped, moreover, a shock that acts in the strain direction of the strain plate 4 can be absorbed. A shock that acts in a direction perpendicular to the strain direction of the strain plate 4 when the weighing machine is dropped can be satisfactorily absorbed in a case where the sides D are also positioned and held by means of the elastic position regulating members, as will be described later in connection with a fourth embodiment mentioned.

A third embodiment of the present invention will now be described with reference to FIG. 10.

In this embodiment, one elastic position regulating member 17 is arranged opposite each side C of a strain plate 4 that extends at right angles to its strain direction B—B.

The position regulating member 17 is a rectangular block that is formed of an elastic member such as a rubber material. A protuberance 17a is provided on the side face of the position regulating member 17 which faces a side wall C of the strain plate 4. Thus, the position regulating member 17 comes into contact with the side C of the strain plate 4 through its protuberance 17a. Further, the position regulating member 17 is provided with a mounting hole 17b. The position regulating member 17 is fixed to a base plate member 3 with the mounting hole 17b fitted on a bent portion 3a of the base plate member 3.

Since fixing members 16 are similar to the ones (fixing members 16 shown in FIG. 9) according to the aforementioned second embodiment, and a description of them is omitted.

In positioning and holding each side C of the strain plate 4 perpendicular to the strain direction B—B by means of the one position regulating member 17, the position regulating member 17 should preferably be arranged in a position substantially opposite to the center of the side C, as shown in FIG. 9. Further, the fixing members 16 are arranged in the same positions (positions of the fixing members 16 shown in FIG. 9) as those in the case of the second embodiment.

Figure 10:
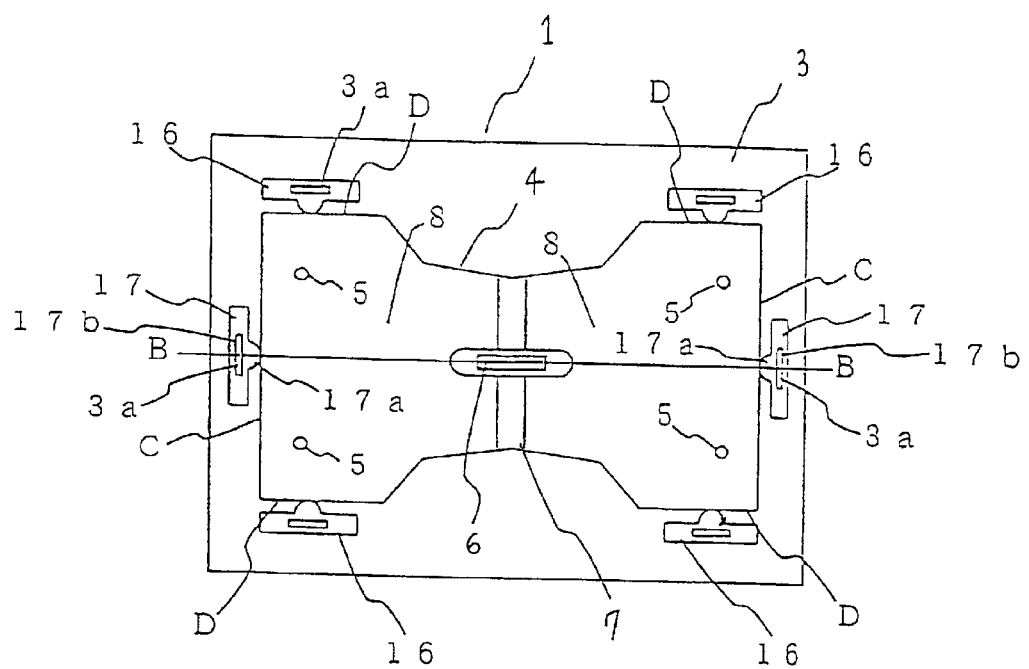
FIG. 10 is a plan view of a weighing machine according to a third embodiment of the present invention, the weighing machine being cleared of its scale plate.

In a weighing machine 1 shown in FIG. 10, the displacement of the sides C of the strain plate 4 perpendicular to the strain direction B—B, which is attributable to the deformation of the strain plate 4, is absorbed by means of the elastic position regulating members 17, and the fixing members 16 engage and hold sides D of the strain plate 4 parallel to the strain direction B—B. Accordingly, dislocation of the strain plate 4 can be prevented. Since the position of the strain plate 4 never changes if the frequency of use increases, therefore, the measurement accuracy can be maintained.

Further, a shock that acts in the strain direction of the strain plate in case of a fall or the like can be absorbed. When the load is removed from the weighing machine 1, the strain plate 4 is restored to its original position by the elastic force of the rubber material of the position regulating members 17. A shock that acts in a direction perpendicular to the strain direction of the strain plate 4 in case of a fall can be satisfactorily absorbed in a case where the sides D are also positioned and held by means of the elastic position regulating members, as will be described later in connection with the fourth embodiment mentioned.

The fourth embodiment of the present invention will now be described with reference to FIG. 11.

In this embodiment, a strain plate 4 is formed with openings 18 that are arranged on a line in the strain direction B—B of the strain plate 4 in positions symmetrical with respect to the strain gauge 6. An elastic position regulating member 17 is arranged opposite an inner wall surface G of each opening 18 that extends at right angles to the strain direction on the side of the strain gauge 6. Further, four elastic position regulating members 17 in total are arranged near the end portions of the sides D of the strain plate 4 parallel to the strain direction B—B such that they oppose the sides D.

Preferably, the position regulating members 17 to be arranged in the openings 18 should be arranged in regions where ranges in which force propagates when load is applied are excluded. In other words, they should be arranged as far from straight lines that connect load receiving portions 5 and the strain gauge 6 as possible.

Figure 11:
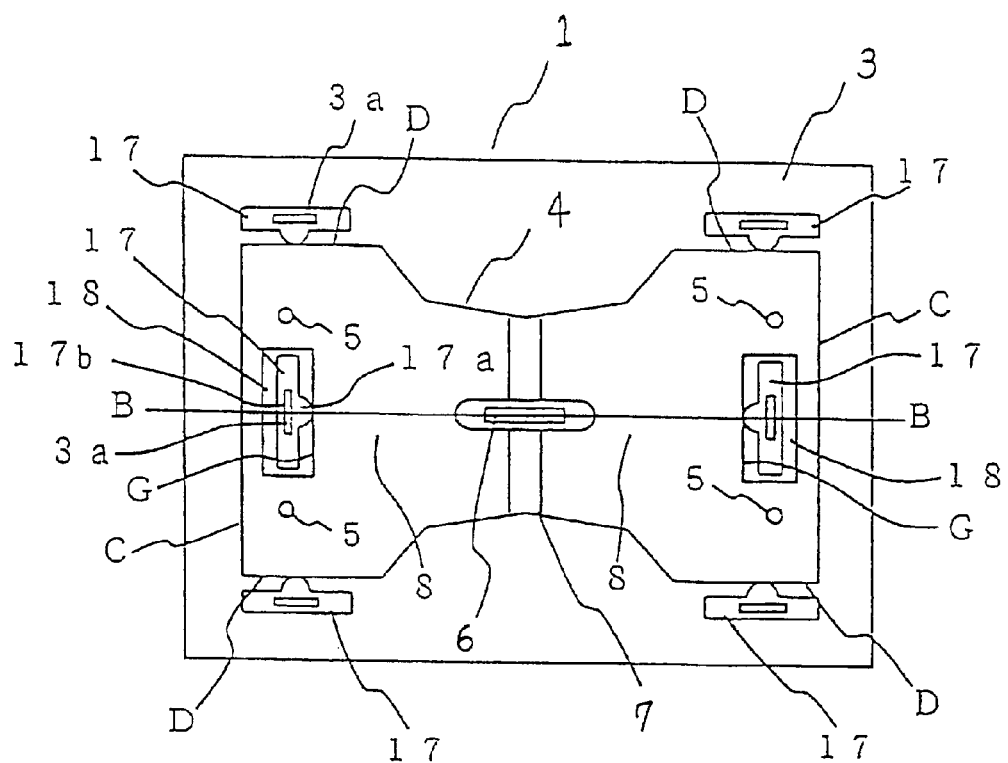
FIG. 11 is a plan view of a weighing machine according to a fourth embodiment of the present invention, the weighing machine being cleared of its scale plate.

The six position regulating members 17 shown in FIG. 11 is the same ones as those described in connection with the third embodiment (FIG. 10). Thus, individual position regulating member 17 comes into contact with the strain plate 4 by means of its protuberance 17a, and is fixed to a base plate member 3 with its mounting hole 17b fitted on a bent portion 3a of the base plate member 3.

In a weighing machine 1 shown in FIG. 11, the deformation of the strain plate 4 is absorbed by the elastic position regulating members 17 that are individually in contact with the respective inner wall surfaces G of the openings 18 extending at right angles to the strain direction B—B of the strain plate 4, and the position regulating members 17 are caused to engage the sides D of the strain plate 4 parallel to the strain direction B—B, whereby dislocation of the strain plate 4 is prevented. Since the position of the strain plate 4 never changes if the frequency of use increases, therefore, the measurement accuracy can be maintained.

Further, a shock caused by a fall of the weighing machine 1 can be absorbed by the six position regulating members 17. When the load is removed from the weighing machine 1, the strain plate 4 is restored to its original position by means of the elastic force of the rubber material of the position regulating members 17. Since the strain plate 4 is provided with the openings 18, moreover, the strain plate 4 is lightened correspondingly. Further, as the position regulating members 17 are arranged inside the outer wall of the strain plate 4, the external shape can be reduced.

A fifth embodiment of the present invention will now be described with reference to FIG. 12.

In this embodiment, the four corners of a substantially rectangular strain plate 4 are cut off at an angle of 45° to form four oblique sides H1 and H2, and elastic position regulating members 17 are opposed to the oblique sides H1 and H2 of the strain plate 4, individually.

The elastic position regulating members 17 are identical with the position regulating members that are used in the third embodiment (FIG. 10) and the fourth embodiment (FIG. 11).

The position regulating members 17 are arranged opposite the sides H1 and H2 of the strain plate 4 that are inclined at an angle of 45° to the strain direction. Accordingly, the individual position regulating members 17 absorb the displacement of the oblique sides H1 and H2 which is attributable to the deformation of the strain plate 4, by their elasticity, and prevent dislocation of the strain plate 4.

Further, a shock that is caused by a fall of a weighing machine 1 can be absorbed by elastic deformation of the four position regulating members 17.

Figure 12:
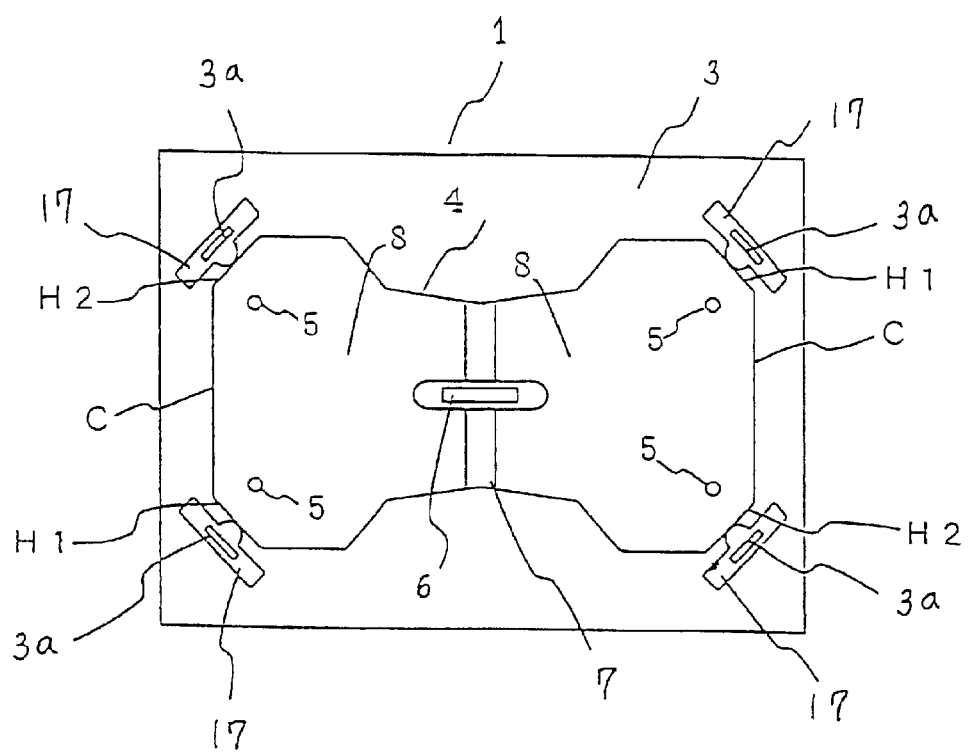
FIG. 12 is a plan view of a weighing machine according to a fifth embodiment of the present invention, the weighing machine being cleared of its scale plate.
Figure 13:
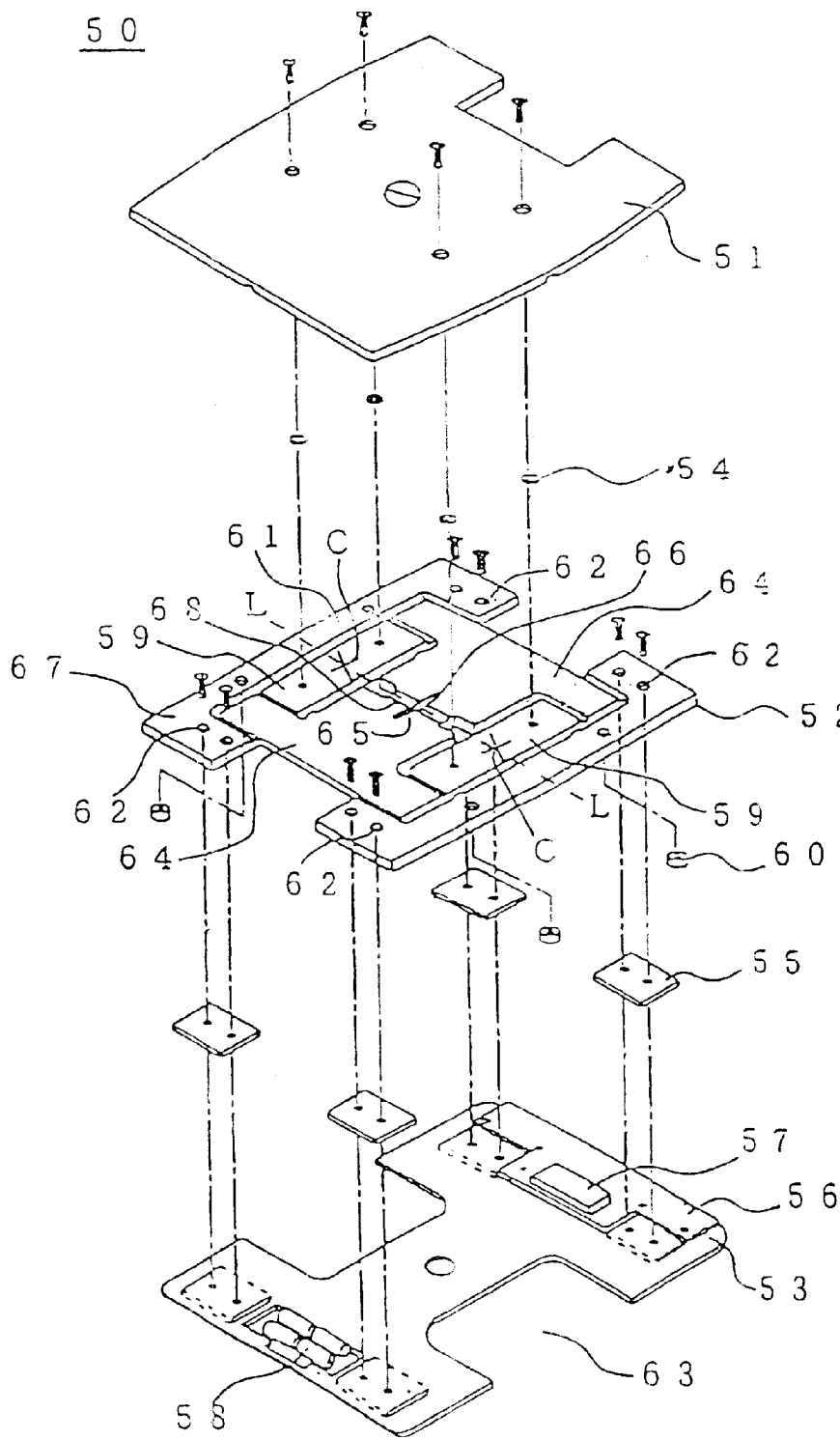
FIG. 13 is an exploded perspective view showing a configuration of a conventional weighing machine.
Figure 14:
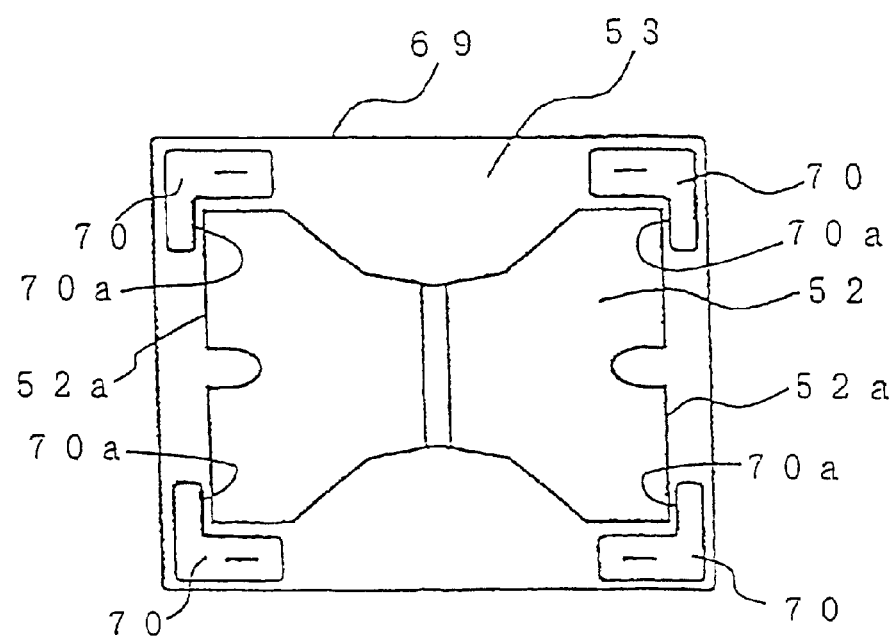
FIG. 14 is a plan view showing a conventional bonding method for a strain plate and a base plate member.

According to the weighing machine 1 of FIG. 12, compared with fourth embodiment, the position regulating members 17 can be reduced from 6 to 4 in number.

In the first to fifth embodiments of the present invention, the position regulating members 14, 15 and 17 are provided with the protuberances 14a, 15a and 17a to lessen the friction of contact with the strain plate 4. Alternatively, however, protuberances may be formed on the strain plate 4 without providing the position regulating members with any protuberances.

INDUSTRIAL APPLICABILITY

In the weighing machine according to the present invention, the strain plate is positioned and held by means of the elastic position regulating members that are mounted on the base plate member, so that the elasticity of the position regulating members can absorb the displacement of the strain plate that is caused when the strain plate is deformed as the weighing machine is loaded. When the strain plate is restored to its original state after the load is removed from the weighing machine, the position regulating members follow the displacement of the strain plate by their elastic force. Even when the weighing machine is not loaded, therefore, the position regulating members are always in contact with the strain plate, so that the position of the strain plate relative to the base plate member that carries it thereon can be kept fixed.

What is claimed is:

1. A weighing machine comprising a substantially flat strain plate adapted to be deformed when loaded, a sensor for detecting deformation of said strain plate, a base plate member carrying said strain plate thereon, and a scale plate member located on the upper surface of said strain plate and capable of transmitting load to said strain plate, wherein said strain plate is placed on said base plate member without being fixed to said base plate member, and sides of said strain plate are held by means of elastic position regulating members, individually.

2. The weighing machine according to claim 1, wherein said strain plate has a strain-direction regulating portion for regulating the direction of a strain produced in said strain plate as said strain plate is deformed, said sensor is a strain gauge attached to said strain plate corresponding to the strain direction of said strain plate, and said position regulating members hold at least the sides of said strain plate which extend at right angles to said strain direction.

3. The weighing machine according to claim 2, wherein said strain plate is formed with at least two sides extending at right angles to said strain direction, opposed to each other across said strain-direction regulating portion, and said two sides are held by said position regulating members, individually.

4. The weighing machine according to claim 3, wherein said position regulating members for holding the sides perpendicular to said strain direction hold the sides of said strain plate perpendicular to said strain direction at a plurality of portions thereof.

5. The weighing machine according to claim 4, wherein said position regulating members for holding the sides perpendicular to said strain direction hold the sides of said strain plate perpendicular to said strain direction at two portions near the opposite end portions thereof.

6. The weighing machine according to claim 2, wherein said position regulating members hold the sides of said strain plate which extend parallel to said strain direction as well as the sides of said strain plate perpendicular to the strain direction.

7. The weighing machine according to claim 6, wherein said strain plate is formed with a plurality of sides parallel to said strain direction, and said plurality of sides are held by means of said position regulating members.

8. The weighing machine according to claim 7, wherein said position regulating members for holding the sides parallel to said strain direction hold the sides of said strain plate parallel to said strain direction at portions near the end portions thereof.

9. The weighing machine according to claim 7, wherein said strain plate is formed with at least two sides extending at right angles to said strain direction and opposed to each other across said strain-direction regulating portion, and said position regulating members for holding the sides perpendicular to said strain direction hold the sides perpendicular to said strain direction at one portion near the center thereof, respectively.

10. The weighing machine according to claim 1, wherein each said position regulating member includes a fixed portion fixed to said base plate member and a contact portion formed integrally with said fixed portion and in contact with the side of said strain plate, and said contact portion is made elastic by a slit formed between said contact portion and said fixed portion.

11. The weighing machine according to claim 1, wherein each said position regulating member is composed of a fixed portion fixed to said base plate member and an elastic portion in contact with the side of said strain plate and attached to said fixed portion.

12. The weighing machine according to claim 2, wherein said strain plate has two openings in positions symmetrical with respect to the strain gauge, and said position regulating members hold the inner walls formed in said openings.

13. The weighing machine according to claim 1, wherein each said position regulating member has a protuberance, and said protuberance is in contact with the side of said strain plate.

14. The weighing machine according to claim 1, wherein the individual sides of said strain plate are arranged so as to be in contact with said position regulating members only.

15. The weighing machine according to claim 6, wherein the plane shape of said strain plate is substantially rectangular, and said position regulating members are substantially L-shaped members arranged individually near the four corners of said rectangular shape.

16. The weighing machine according to claim 15, wherein said substantially L-shaped member is formed with a hole portion such that the L-shaped member can be fixed to said base plate member with said hole portion fitted on a fitting member protruding substantially perpendicularly from said base plate member.

17. The weighing machine according to claim 6, wherein said position regulating members for holding the sides of said strain plate perpendicular to the strain direction and said position regulating members for holding the sides of said strain plate parallel to the strain direction are formed separately from one another.

18. A weighing machine comprising a substantially flat strain plate adapted to be deformed when loaded, a sensor for detecting deformation of said strain plate, a base plate member carrying said strain plate thereon, and a scale plate member located on the upper surface of said strain plate and capable of transmitting load to said strain plate, wherein said strain plate is placed on said base plate member without being fixed to said base plate member, and the position of said strain plate in the planar direction is settled by means of elastic position regulating members.

19. The weighing machine according to claim 15, wherein the portion of said L-shaped member which faces a side of said strain plate perpendicular to the strain direction is provided with a slit extending parallel to the side perpendicular to said strain direction, and the portion of said L-shaped member which faces a side of said strain plate parallel to the strain direction is provided with a slit extending parallel to the side parallel to said strain direction, whereby said L-shaped member is made elastic.

20. The weighing machine according to claim 13, wherein said protuberance is in the shape of a semi-cylinder or hemisphere.

21. The weighing machine according to claim 16, wherein said fitting member is formed by slitting and raising a part of said base plate member.

22. The weighing machine according to claim 15, wherein said base plate member has side walls set up thereon, and the size of said position regulating members is regulated such that gap be not formed between said side wall and said position regulating member.

23. The weighing machine according to claim 1, wherein said position regulating members are formed of an elastic material such as rubber.

24. The weighing machine according to claim 1, wherein said strain plate is formed with a straight groove for regulating the direction of a strain formed as said strain plate is deformed, said strain plate has oblique sides inclined at about 45° to the direction of said groove, and said oblique sides are held by means of said position regulating members, individually.

* * * * *